United States Patent [19]

Pagni

[11] Patent Number: 5,240,528
[45] Date of Patent: Aug. 31, 1993

[54] FOAMED CORE FURNITURE STRUCTURE AND METHOD OF MAKING SAME

[76] Inventor: Larry P. Pagni, 5625 E. Horseshoe Rd., Paradise Valley, Ariz. 85253

[21] Appl. No.: 708,441

[22] Filed: May 31, 1991

[51] Int. Cl.⁵ .................... B29C 67/20; B32B 5/20
[52] U.S. Cl. ................................. 156/79; 156/63; 264/46.6; 428/15
[58] Field of Search .................. 156/79, 304.1, 63; 264/466; 125/1; 52/612, 806, 405, 309.9, 743, DIG. 2, DIG. 7, 251, 252; 428/15

[56] References Cited

U.S. PATENT DOCUMENTS

| | | | |
|---|---|---|---|
| 3,512,327 | 5/1970 | LaPadura | 52/309.12 |
| 3,931,772 | 1/1976 | Puccio | 52/724 |
| 3,950,202 | 4/1976 | Hodges | 52/612 |
| 3,963,846 | 6/1976 | Bourke | 52/806 |
| 3,970,502 | 7/1976 | Turner | 52/309.9 |
| 3,984,957 | 10/1976 | Piazza | 52/405 |
| 4,151,239 | 4/1979 | Ogden | 264/46.6 |
| 4,259,028 | 3/1981 | Cook | 156/79 |
| 4,624,815 | 11/1986 | Moufarrege | 264/246 |
| 4,700,520 | 10/1987 | Ting | 52/520 |
| 4,822,661 | 4/1989 | Battaglia | 156/254 |

*Primary Examiner*—Michael W. Ball
*Assistant Examiner*—Daniel J. Stemmer
*Attorney, Agent, or Firm*—Rosenbaum & Schwartz

[57] ABSTRACT

A monolithic-like stone furniture piece and method is provided, wherein the furniture piece consists of a plurality of panels joined to form the three-dimensional structure of the furniture piece, wherein the panels are joined in a box-like structure having a hollow cavity. A foam core is injected or inserted into the hollow cavity to provide structural integrity and rigidity for the furniture piece. The plurality of panel members are formed of a plurality of stone tile members butt-joined in end-to-end and side-to-side fashion to form the panel members making up the furniture structure.

4 Claims, 2 Drawing Sheets

FOAMED CORE FURNITURE STRUCTURE AND METHOD OF MAKING SAME

BACKGROUND OF THE INVENTION

This invention relates generally to a method of making a stone veneer product. More particularly, the present invention relates to a stone veneer furniture structure of a naturally-occurring stone material formed of a plurality of stone tiles made into planar panels and joined to form a hollow structure, into which a foamed core may be inserted for increased structural integrity.

It has long been known to use materials such as marble, granite or other naturally-occurring stone materials for architectural and furniture purposes. Many such materials have been used for structural purposes because of their beauty, permanence, compression strength and wear resistance. Other materials, such as marble, have also been used for decorative purposes because they can be polished to a very high finish and because such materials occur in many different colors with many different patterns from naturally occurring random veining. A principal drawback to using naturally-occurring stone materials for furniture has been the weight of the slabs used to make the furniture, breakage and limits of design.

Accordingly, it is desirable to provide a product and method for producing the product which provides a surface of marble, natural stone material, or a synthetically made composite stone material, which may be made into a plurality of co-planar panels, the panels being joined to form a hollow core furniture structure, such as a table, desk, bench, or other furniture structure.

It is also desirable to provide a method for producing stone veneer products carried out using standard stone working material such as bridge saws, gang saws, grinders, polishers, chip hammers, etc. It is also desirable to provide a method of joining relatively thin stone tiles in an end-to-end and side-to-side butt-joined fashion to produce the planar panels which may, in turn, be worked into shapes necessary to form the desired furniture product with the a desired combination of color and veining patterns.

Finally, it has been found desirable to reinforce the structural integrity of a hollow veneered stone furniture structure by injecting a foam material into the finished hollow structure. Internal buttressing of the planar members may be used as will be appreciated by those skilled in the art.

Prusinski, et al., U.S. Pat. No. 3,232,017, issued Feb. 1, 1966, discloses an insulated structural panel having a foam core underlying an ornamental facing which consists of a particulate material. The panel employs preformed foam blocks used as an adhered backing for the facing. A second layer of a resin, having a mineral particulate filler, is poured over the foam blocks to complete the panel structure.

La Padura, U.S. Pat. No 3,512,327, issued May 19, 1970, discloses a structural body having a lightweight core. This patent is directed principally to the method of making a structural body from a particulate material and using a porous plastic material, such as a foamed core to form a lightweight structure. The structural components are not, however, completely assembled until after the foamed core material is in place on one side of the structure shell.

Bourke, U.S. Pat. No. 3,723,233, issued Mar. 27, 1973, discloses a marble-faced wall panel having a honeycomb backing onto which a marble veneer is attached. The honeycomb backing is a structural support for a marble tile or panel, but requires a resin adhesive for affixing the honeycomb backing.

U.S. Pat. No. 3,646,180, issued Feb. 27, 1972, discloses a method for forming a foam cored wall panel having a ceramic tile facing. This patent discloses a process whereby tiles are adhered to an underlying fiber layer and reinforced with a polyester resin to contact the side of the tiles and an underlying foamed core.

U.S. Pat. No. 3,984,957, issued Oct. 12, 1976, discloses a composite building module which consists generally of a fiber reinforced cement piece having a foam core interdisposed between the fiber reinforced cement piece and an opposing cement cap piece. This patent is principally directed to providing lightweight monolithic building modules having approved insulating and vapor barrier properties.

U.S. Pat. No 3,950,202, issued Apr. 14, 1976, discloses a method of making a composite natural stone veneer product using honeycomb support backings for large structural panels. While this patent contemplates that the invention can be used to produce furniture for structural uses such as desks, tabletops, benches, billiard tabletops, vanities, stair treads, doors, shelves, etc., there is no disclosure relating to forming a three-dimensional structure with a hollow cavity and injecting a foam support layer without the use of adhesives to bind the stone facing onto the underlying support matrix.

U.S. Pat. No. 4,942,702, issued Jul. 24, 1990, discloses a prefabricated wall panel which consists of two layers of cement corresponding to internal and external walls of the panel and having an insulating material inserted between the internal and external walls of the panel during manufacturing. The panels require numerous nut and bolt connectors to join the panels in adjoining fashion.

Each of the foregoing patents relate generally to the use of a foam core or a composite honeycomb core structure as a backing for a stone veneer. None of these patents, however, illustrate that a plurality of small stone tiles may be butt-joined in end-to-end and side-to-side fashion in a manner to form planar tile structures, which may, in turn, be worked into panels needed to form the ultimate furniture structure. None of the foregoing patents disclose a method whereby a hollow furniture structure is formed and then injected with a foam core to substantially fill the hollow cavity formed by the joined panels to impart strength, shipping facility and sound deadening to the finished furniture piece.

SUMMARY OF THE INVENTION

It is, therefore, an object of the invention to provide a means for assembling an ornamental panel which is, in turn, useful in forming the panels of furniture structures, such as the formation of a table, desk, or other furniture object.

Another object of the invention is to provide a panel construction which is of high strength obtained through the use of a plurality of stone tiles, butt-joined in end-to-end and side-to-side fashion to form panels which are then cut and assembled into the panel structures for a furniture object having a hollow cavity formed between the panels. A foam material is injected into the hollow cavity to provide a substratum support structure which creates a monolithic-like furniture piece, thereby resulting in a pleasant appearance of a solid stone furniture piece, without the accompanied weight of a similarly sized solid natural stone furniture piece.

It is another object of the invention to provide a furniture structure which has an appearance of a solid stone object, but is lightweight due to the use of a foam core within a hollow cavity in the furniture object.

It is still a further object of the invention to provide a furniture construction which can be manufactured with relatively simple, low cost, conventional stone working methods and equipment.

These and other objects, features and advantages of the invention will appear in the following more detailed description of the preferred embodiments, with reference to the accompanying drawings wherein like reference characters designate corresponding parts in the several views.

DETAILED DESCRIPTION OF THE PREFERRED EMBODIMENTS

Figure 1:
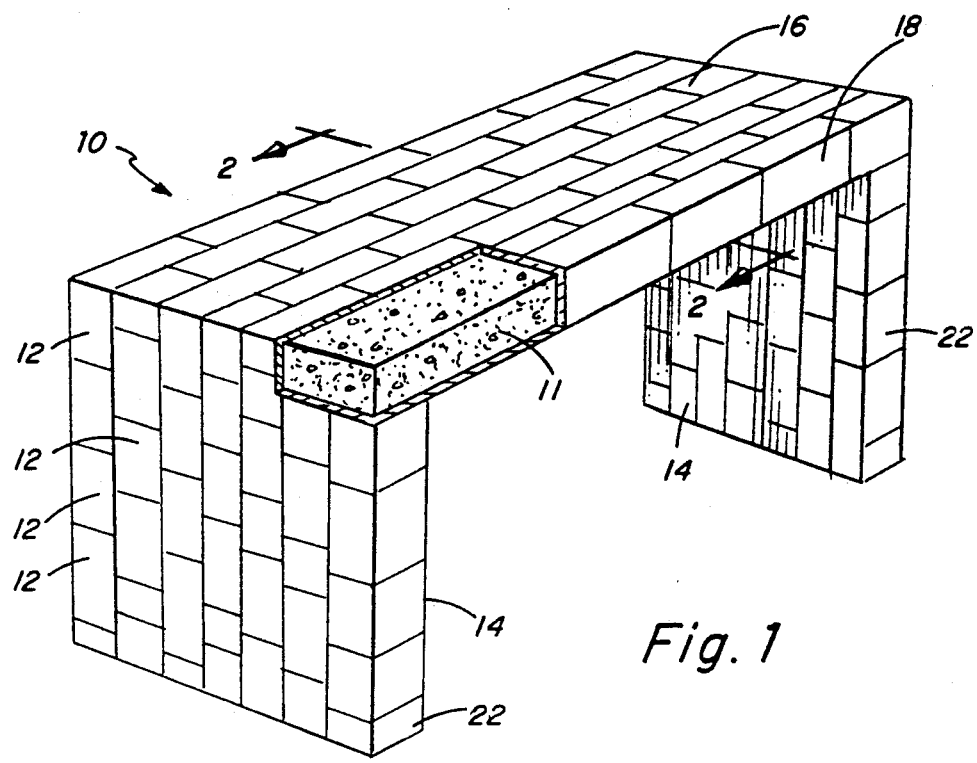
FIG. 1 is a perspective partial cutaway view of a foamed core furniture piece in accordance with the present invention.
Figure 2:
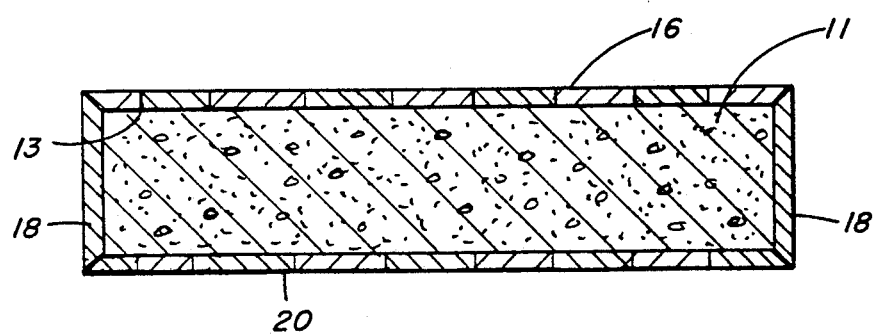
FIG. 2 is a cross-sectional view taken along line 2—2 of FIG. 1.
Figure 3:
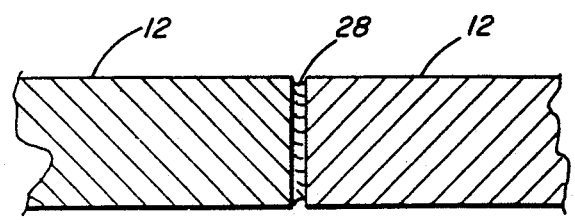
FIG. 3 is a side elevational view of a pair of tile pieces butt-joined in end-to-end fashion.

In accordance with the preferred embodiment of the present invention, as illustrated in FIGS. 1-3, there is provided a furniture object 10. Furniture piece 10 is represented as a table for purposes of example and illustration only and is not intended to be limiting of the scope and content of the invention. The furniture piece 10 consists generally of a plurality of panels joined to form the furniture piece structure. In the illustrated embodiment, a table, there is provided a pair of legs 14 and a top surface 16. As illustrated in FIG. 2, the top surface 16 is formed in a box-like structure consisting of panels 16, 18, and 20 forming the top surface, side surfaces, and bottom surface of the box-like structure, respectively. The legs 14 are also constructed in a box-like structure having, for example, panels 22 forming a side aspect thereof.

Each of the panels forming the top, side, frontal, bottom and rearward surfaces of the furniture object, and comprising the box-like structure as illustrated in FIG. 2, are comprised of a plurality of tile pieces 12 which are milled in generally rectilinear configurations of uniform or random length and butt-joined in end-to-end and side-to-side fashion to form generally rectilinear panels 16, 18 and 20. Inlays of contrasting material, e.g., precious or semi-precious materials, may be worked into the pattern of joined tiles pieces 12. Tile shape may be varied so long as the tiles 12 are capable of assembly into a planar panel. Once the larger panels, comprised of a plurality of smaller tiles 12, are joined into the larger panels, the larger panels may be cut to the requisite size to form the different surfaces of the furniture object 10 which is desired. Those skilled in the art will recognize that the plurality of panels may be sized and shaped in accordance with the desired furniture object to be constructed.

As illustrated in FIG. 3, the tile pieces 12 are butt-joined using an epoxy resin adhesive 28 to provide an adherence between the tile pieces 12.

Upon forming of the larger panels 16, 18, and 20, the corners may be miter cut or may be joined in an otherwise known fashion to create the box-like structure illustrated in FIG. 2. Once the box-like structure is formed, there will be a hollow cavity 13 formed within the box-like structure defined by the panels. The panels may be ground smooth to provide a level surface free of protrusions, or may be worked to provide an uneven or rough-look, as desired. After grinding, the surfaces may be polished, as desired.

In order to enhance the structural rigidity of the furniture piece 10, a foam core 11 is provided within the hollow cavity 13 by way of inserting rigid pre-cast foam pieces, or preferably, by injecting, under pressure, a polyurethane foam material. The injection of a fluid polyurethane foam into the hollow cavity 13 facilitates a substantially complete filling of the hollow cavity 13 in all or substantially all aspects of the box-like structure. Use of a fluid polyurethane material has been found desirable due to surface interactions between the stone pieces and the foam material which enhance the overall strength of the furniture piece and form a monolithic-like structure.

As will be recognized by those skilled in the art, it may be desirable, depending upon the material used for the tiles 12 as well as the size and configuration of the furniture object 10, to further enhance the strength of the tile panels by affixing a fiberglass, or other fiber woven material, to the back surface of the panels, prior to cutting to the desired size and shapes of the furniture object 10.

Any type of stone material, including naturally occurring or synthetic molded stone materials, which are capable of milling into tile pieces of random length, and having a uniform thickness, preferably of no less than about 1 cm, may be used in the present invention. The materials selected for tiles 12 may be any material suitable for forming a furniture structure, but in accordance with the preferred embodiments of the invention, is a naturally-occurring stone, such as marble or granite. Any type of rigid, porous, plastic material may be employed as the core material, whether the porous plastic is prepared by a foaming process or with the aid of blowing agents. Suitable porous plastics includes rigid forms of expanded or foam polyethylene, polyurethanes, polystyrene, polyvinyls, cellulose acetate, phenolics, polyepoxies, silicones, etc. Additionally, rigid, non-porous plastic cores may also be employed.

The epoxy resins used to form the butt joints 28 may be of any variety of a curable resin. A suitable resin may be either an epoxy resin or a polyester resin. Chemically, epoxy resins consist generally of a reaction product of epichlorahydrin and Bisphenol "A" made under alkaline conditions. Other dihydric phenols may be used to react with the epichlorahydrin to produce suitable epoxy resins. The epoxy resins can be characterized chemically as glycidylethers of dihydric phenols. Polyester resins consist of the reaction product of a dibasic acid and dihydric alcohol dissolved in a polymerizable monomer. The dibasic acids used in the resin solution may be phthalic anhydride, iso-phthalic acids, adipic acid, tetraphthalic anhydride, maleic acid, fumaric acid or itaconic acid. The dihydric alcohols in the polyester resin solution may, for example, be any glycol such as ethylene glycol, propylene glycol, diethylene glycol, dipropylene glycol, or 1-3 butylene glycol. The polymerizable monomer used in the polyester resin solution can, for example, be styrene, vinyl toluene, methyl methacrylate, or diallyl phthalate.

The present invention is not concerned with the particular resins or foam materials, per se, but it will be understood by those skilled in the art that resinous materials and foam materials other than those specified above may be employed in the practice of the invention.

Figure 4:
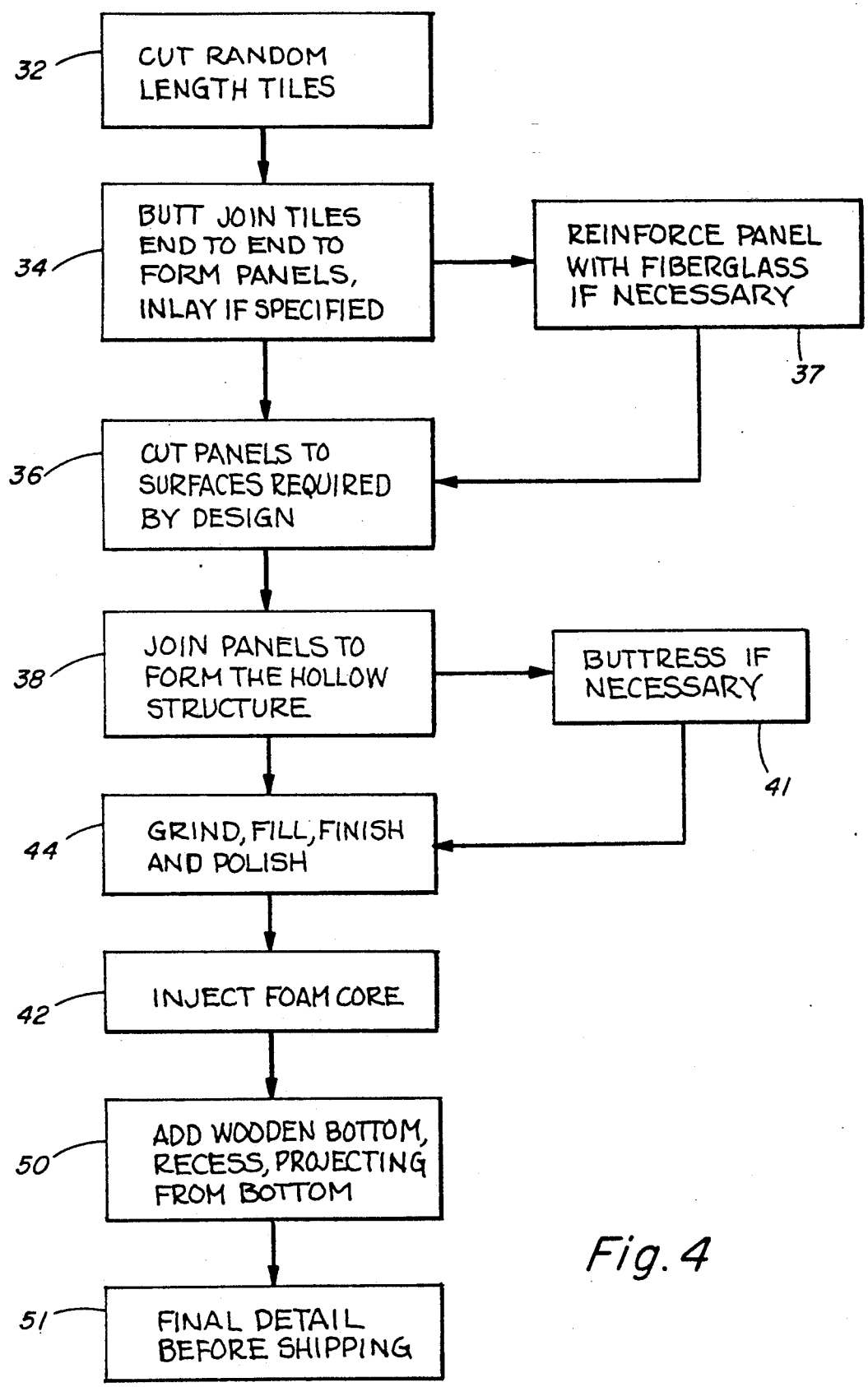
FIG. 4 is a flow diagram illustrating the method of constructing the foam core furniture object according to the preferred embodiment of the present invention.

Turning now to the method of making the furniture object in accordance with the present invention, and as illustrated in FIG. 4, the furniture object 10 is made by obtaining and selecting a plurality of stone pieces, which are cut into tiles of random length 32. The tiles are then laid out in a desired panel shape to form the design, if desired, for the furniture object, and then may be butt-joined 34 to form longitudinal strips of the stone tiles. The longitudinal strips may then be butt-joined in side-to-side fashion 36 to form a plurality of panels which will be used for the surfaces of the furniture object. It may be desirable, depending upon the size, shape of the object to be made, as well as the selection of tiles used, to reinforce the back of each panel, i.e., the surface which will form the hollow cavity 13, and not be visible upon finished construction, with a fiberglass matt sheet, or such other reinforcing material as may be known in the art.

Once the panels have been formed, the panels are then cut 38 to form the structural surfaces of the furniture object. For example, a table may consist of, as illustrated in FIG. 1, three generally rectilinear box-like structures, one forming the top of the table, and two forming the legs of the table.

In accordance with the present invention, those skilled in the art will understand and recognize that internal supports, such as buttressing or ribbing, may be employed if required given the size and shape of the furniture object being made 41.

Once the panels are joined to form the hollow structure, and the panels are secured in structural relationship, such as by the epoxy adherent, the foam core is injected 44 into the hollow cavities 13 in each of the box-like structures forming the overall structure of the furniture object 10. The furniture object is polished and finished 44 in accordance with known finishing techniques. The foam is then injected 42 under pressure using any of known blowers or other mechanical injectors which will permit an introduction of the foam material into the hollow cavity 13.

The joining of linear tiles 12 minimizes any weak zones present in the native stone, such as presented by veins, by interrupting force vectors or transmission of disruptive forces through the stone. Additionally, the joining of linear tiles 12 adds a minor amount of flexibility to the piece by subdividing the panels into discrete joined cells. Further, by using tiles 12, the panels may be assembled in a manner which provides a more uniform color tone than in the native piece and permits veins to be chased, such as around corners.

As a result of the foregoing process, the present invention provides a monolithic-like furniture object which is extremely lightweight, as compared to solid stone furniture. Because the present invention utilizes a foamed core and an adhesive interlock between the individual tile pieces as well as the panel structures forming the furniture piece, an adhesive interlock is formed between the core and the shell, thereby rendering the bond stronger than either material by itself.

While the invention has been described in accordance with the preferred embodiments thereof, the foregoing description is not intended to be limiting of the spirit and scope of the invention. Rather, those skilled in the art will understand and appreciate that variations in selection of materials, specific construction and design, and conditions of manufacture, may be used in manufacturing the foam core furniture objects of the present invention, without departing from the spirit and scope of the invention.

What is claimed is:

1. A method for forming a lightweight stone furniture piece, comprising the steps of:
   a. providing a plurality of stone tile members;
   b. adhesively butt-joining said plurality of stone tile members to form generally planar panel members;
   c. assembling said plurality of panel members to form a plurality of hollow-core furniture members each having at least one hollow cavity and interconnecting said plurality of hollow-core furniture members to form said furniture structure, wherein said hollow-core furniture members are joined in a manner whereby said at least one hollow cavity in each of said plurality of hollow core furniture members forms a continuous hollow cavity within the furniture structure; and
   d. thereafter providing a foam core within said hollow cavity by injecting a fluid plastic which substantially fills the hollow cavity and hardens, thereby reinforcing said furniture structure.

2. The method according to claim 1, wherein said step of providing a plurality of stone tile members comprises providing tiles that have a generally rectilinear shape.

3. The method according to claim 1, wherein said step of adhesively butt-joining said plurality of stone tile members comprises joining said plurality of stone tile members in an end-to-end and side-to-side fashion.

4. The method according to claim 1, wherein said step of injecting said foam plastic material comprises selecting said foam plastic material from the group consisting of polyethylene, polyurethane, polystyrene, polyvinyl, cellulose acetate, phenolics, polyepoxies, and silicones.

* * * * *